United States Patent [19]

Veronesi et al.

[11] Patent Number: 5,025,158

[45] Date of Patent: Jun. 18, 1991

[54] HYDROBALL DETECTOR STRING STEPPING DEVICE

[75] Inventors: Luciano Veronesi, O'Hara; Douglas E. Ekeroth, Delmont, both of Pa.

[73] Assignee: Westinghouse Electric Corp., Pittsburgh, Pa.

[21] Appl. No.: 461,576

[22] Filed: Jan. 5, 1990

[51] Int. Cl.$^5$ .............................................. G21C 17/02
[52] U.S. Cl. .................................. 250/328; 376/254; 406/192
[58] Field of Search ........................ 376/254; 250/328; 406/192

[56] References Cited

U.S. PATENT DOCUMENTS

| 2,679,990 | 6/1954 | Mathzeit et al. | 406/4 |
| 4,927,593 | 5/1990 | Impink, Jr. et al. | 376/254 |

*Primary Examiner*—Constantine Hannaher

[57] ABSTRACT

A stepping apparatus uses two gate elements driven by solenoid actuators to block a detector string as it is advanced to a gamma counter so that the string can be advanced at a controlled rate, one ball at a time. The gate elements each have two interconnected passages, one of which permits passage of the entire detector string, while the other permits passage of the cable but not the balls.

12 Claims, 3 Drawing Sheets

HYDROBALL DETECTOR STRING STEPPING DEVICE

BACKGROUND OF THE INVENTION

1. Field of the Invention

The present invention relates generally to a hydroball in-core instrumentation system and, more specifically, to a stepping apparatus for regulating feed of a hydroball string to a gamma counter.

2. Description of the Related Art

A hydroball in-core instrumentation system and method of operation are described in U.S. patent application Ser. No. 024183, filed April 24, 1987, now abandoned, which is incorporated herein by reference. The aforementioned system includes detector string transfer tubes, leading to and from the reactor vessel, provided for each detector string. Typically, there are approximately fifty such tubes and forty-eight detector strings for a typical two or three loop plant.

The structure pointed out in the above-mentioned patent application uses detector strings which are capable of being passed through very small diameter tubes with short bend radii without inducing excessive drag and pressure drop. The tubes pass through a heat exchanger or flow cooler tank. Tubes passing through the heat exchanger are connected to a system of solenoid valves.

A detector string storage position is provided between a transfer device and the solenoid valves. The detector string storage position may be simply that section of the tubes extending between the valves and the transfer device. Each detector string may be individually and selectively transported into or removed from its original storage position by means of the transfer device. A fluid handling system generates the flow of primary coolant for selectively moving the detector strings for insertion into and withdraw from the vessel and for the handling or transport functions associated with the in-core instrumentation system readout room.

A new detector string is inserted through the detector loading funnel after opening the valve between the funnel and the transfer device. The transfer device is set to a position which allows entry of the new detector string, while appropriate valves are open to permit the detector circulation pump to produce a flow which impels the detector string into a counter, whereupon a forward end of the detector string comes to rest against a stop. The transfer devices is then moved to its connection position corresponding to the position of the new detector string to pass into the detector storage position.

Each string used in the hydroball instrumentation system uses stainless steel balls on a twelve foot cable which move in and out of the reactor core under the force of the reactor coolant flow. The forty-eight strings in the system are to be counted by one gamma counter. A transfer device is necessary to align each of the fifty tubes containing the strings with the one tube of the gamma counter. The device must be able to operate at about 2,250 psi (15.5 MPa).

After irradiation in the reactor core, each ball on every string must be passed by the counter to register activity. The balls must be accurately positioned for a known and repeatable time interval at the counter. The string is inside a high pressure boundary in a radioactive system, and thus, the pressure boundary must be maintained.

SUMMARY OF THE INVENTION

An object of the present invention is to provide a method and apparatus for positioning each ball of a detector string for a known time interval in front of a counter.

Another object of the present invention is to provide an apparatus for advancing a detector string in steps to a gamma counter, without breaching the pressure boundary.

Another object of the present invention is to provide a stepping apparatus which is mechanically uncomplicated and functionally simplistic, thereby minimizing the number of moving parts.

These and other objects of the present invention are met by providing a stepping apparatus for advancing a hydroball detector string having a plurality of spaced apart balls on a cable and being movable to a counter through a tube under fluid, the apparatus including first and second gate means disposed upstream of the counter for blocking movement of the string without blocking fluid flow through the tube, and actuator means for moving the first and second gate means in steps into and out of blocking positions in the tube to thereby advance the string one ball at a time to the counter.

In another aspect of the present invention, a method of advancing a hydroball detector string having a plurality of spaced apart balls on a cable and being movable to a counter through a tube under fluid pressure, includes blocking a first ball of the detector string by abutment with a first gate, moving a second gate between an adjacent ball and the first ball, withdrawing the first gate from a blocking position, whereby fluid pressure advances the detector string towards the counter until the adjacent ball abuts the second gate, thereby completing a first step, moving the first gate between the first ball and the adjacent ball, and withdrawing the second gate from a blocking position, whereby fluid pressure advances the detector string towards the counter until the adjacent ball abuts the first gate, thereby completing a second step.

These and other features and advantages of the stepping apparatus for advancing a hydroball detector string of the present invention will become more apparent with reference to the following detailed description and drawings.

DETAILED DESCRIPTION OF THE PREFERRED EMBODIMENT

Figure 1:
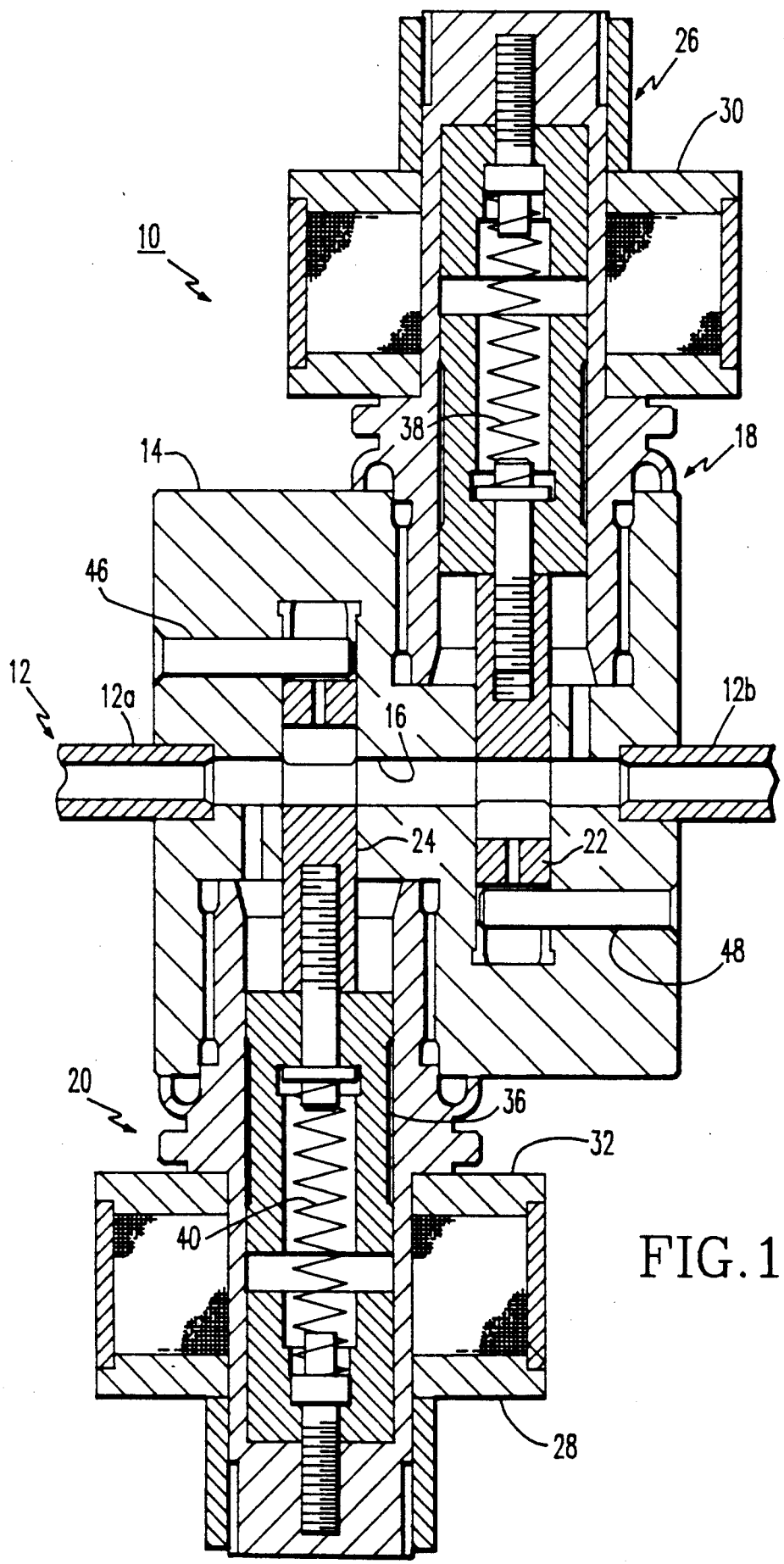
FIG. 1 is a verticle sectional view of a preferred embodiment of the stepping apparatus according to the present invention.
Figure 2:
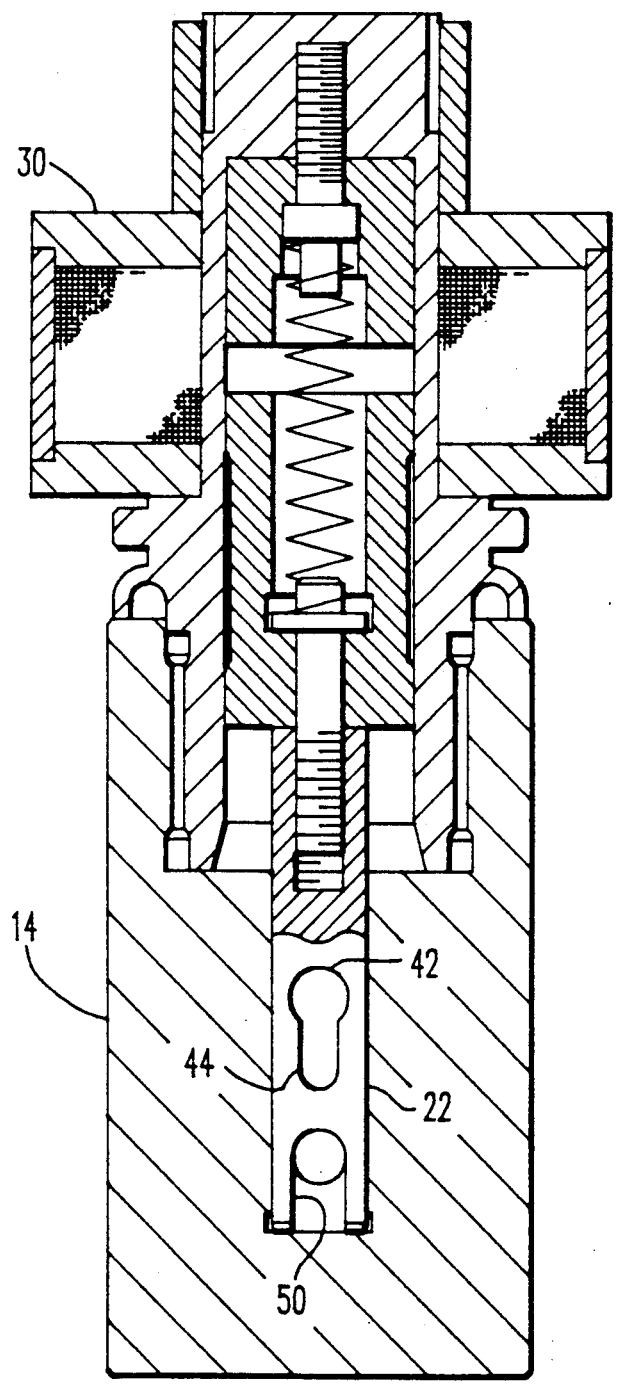
FIG. 2 is a transverse vertical sectional view, partially cut away, showing the stepping apparatus of FIG. 1.

Referring now to FIGS. 1 and 2, a stepping apparatus for advancing a hydroball detector string is generally referred to by numeral 10. The stepping apparatus 10 is spliced into a tube 12 leading from the reactor core (not shown) and extending to the gamma counter (not shown).

A body member 14 has an axial passageway 16, the opposite ends of which are connected in line with end portions 12a and 12b of the tube 12. To maintain a pressure boundary, the ends 12a and 12b of the tube 12 are secured by, for example, welding or other suitable means.

The stepping apparatus 10 includes two gate means 18 and 20 which are disposed upstream of the gamma counter for blocking movement of the string without blocking fluid flow through the tube 12, as will be described in greater detail below.

Each gate means includes a gate element 22 and 24, each of which is slidably movable in respective transverse bores in the body member 14 which insect the axial bore 16. The gate elements 22 and 24 are driven by solenoid actuators 26 and 28, respectively. Each solenoid actuator includes a coil portion 30 and 32 and a core portion 34 and 36, respectively. When the solenoid actuators are electrically energized, the corresponding gate elements are driven downwardly by virtue of their being connected to the core portions 30 and 32. Return springs 38 and 40 bias the gate elements 22 and 24, respectively, back to the initial position.

As shown in FIG. 2, gate element 22 (which is identical to gate element 24) has a first passage 42 which is substantially circular and has a diameter sufficiently large to permit passage of the detector string including both the cable and balls. A second passage 44 is a vertically extending slot which permits passage of the cable of the string detector but not the balls. Thus, when the gate element 22 is lifted upwardly so that the second passage 44 is aligned with the axially bore 16 of the body member 14, balls of the string detector will be blocked by abutment with the gate member 22 at the second passage 44.

Other features of the stepping apparatus 10 include guides or stops 46 and 48 which are fixedly received in axial bores, and which are parallel to the axial bore 16 and intersect the transverse bores in which the gate elements 22 and 24 are received. The stops have end portions which extend into the transverse bores for abutment with an axial slot 50 provided in the end of each gate element, so that when the gate element is in the open position, such that the first passage 42 is aligned with the axial bores 16, the bottom of the slot 50 will abut the end of the stop 46 or 48.

Figure 3A:
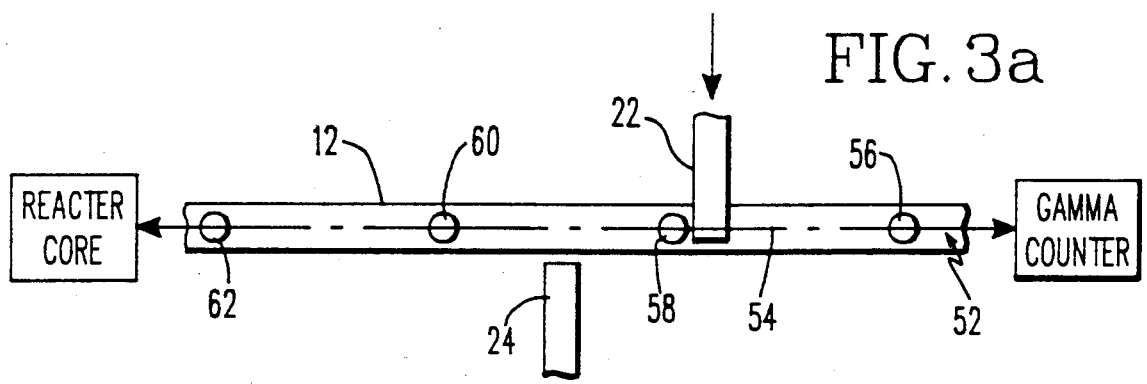
FIGS. 3a–3c are sequential, schematic views showing operation of the stepping apparatus in a method of advancing the hydroball detector string to a gamma counter.
Figure 3B:
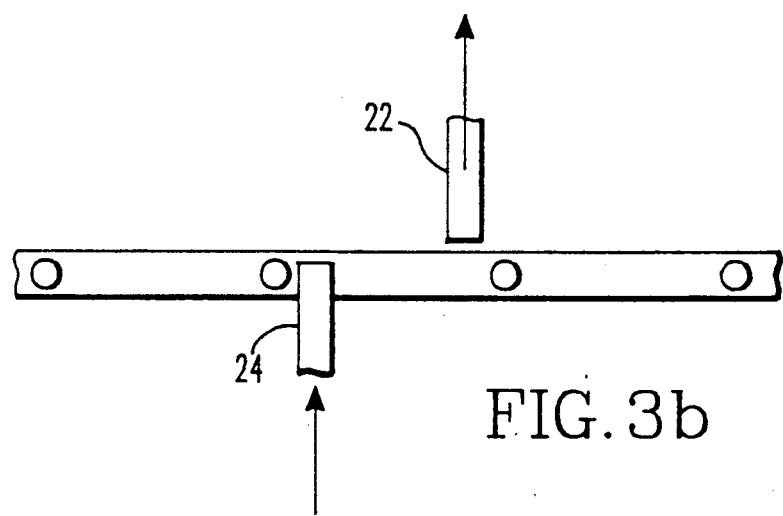
Figure 3C:
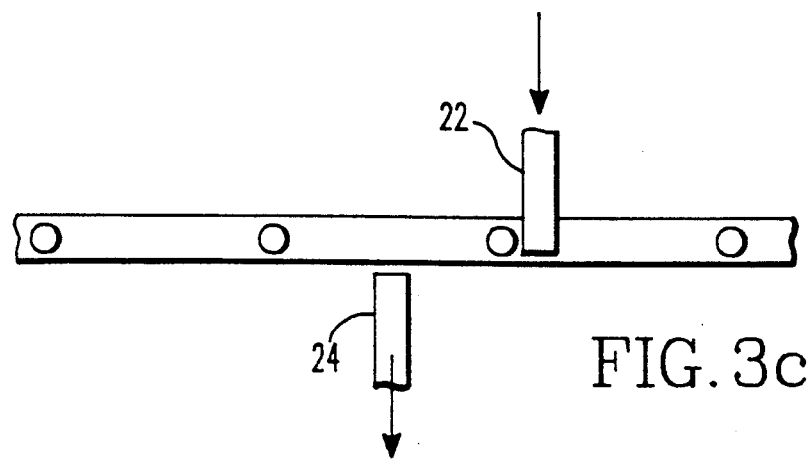

FIGS. 3a–3c are schematic, sequential steps showing the method of advancing a detector string 52 towards a gamma counter. The detector string 52 includes a cable 54 which carries a plurality of balls 56, 58, 60 and 62. FIG. 3a is a starting position in which a first ball 58 abuts the first gate element 22 so that the detector string is prevented from advancing. In this position, the gate element 22 is in a lower position in which the second passage 44 is aligned with the axial passageway 16. Although the ball abuts the passage 44, fluid under pressure can pass through the passage. At the same time, gate element 24 is in a retracted position, such as what is illustrated in FIG. 1.

In a first step to advance the detector string 52, the gate element 24 is moved to a blocking position, in which the second passage is moved into alignment with the axial bore 16. Then, the gate element 22 is moved out of the blocking position so that the first ball is no longer abutting the second passage of the gate element. The detector string 52 advances under fluid pressure until the ball 60 which is adjacent to the first ball 58 comes into abutment with the second passage of the gate element 24.

Next, the gate element 22 is moved back into the blocking position behind the first ball 58, and then the second gate element 24 is moved out of the blocking position so that the detector string advances once again until the adjacent ball 60 abuts the first gate element 22. These steps are repeated in sequence to advance the detector string 52 one ball at a time to the gamma counter.

The solenoid actuators 26 and 28 can be controlled by a controller and timer so that the gamma counter can count each ball for a predetermined time. At the end of the gamma counting process, both gate elements are moved to the open position so that the entire detector string can be retracted under reverse flow of fluid.

Numerous modifications and adaptations of the present invention will be apparent to those skilled in the art and thus, it is intended by the following claims to cover all such modifications and adaptations which fall within the true spirit and scope of the invention.

What is claimed is:

1. A stepping apparatus for advancing a hydroball detector string having a plurality of spaced apart balls on a cable and being movable in a direction of a counter through a tube under fluid pressure, comprising:
   first and second gate means operably coupled to the tube upstream of the counter, for blocking movement of the spring without blocking fluid flow through the tube; and
   actuator means for moving the first and second gate means in steps into and out of blocking positions in the tube to thereby advance the string one ball at a time to the counter.

2. A stepping apparatus as recited in claim 1, wherein each of the first and second gate means comprises a gate element movable transversely into the tube.

3. A stepping apparatus as recited in claim 1, further comprising a body member having an axial bore, the opposite ends of which are sealingly coupled to the counter tube, and through which the detector string travels, the first and second gate means being mounted in the body member.

4. A stepping apparatus as recited in claim 3, wherein the body member has first and second transverse bores intersecting the axial bore and slidably receiving the first and second gate members, respectively.

5. A stepping apparatus as recited in claim 4, wherein the actuator means comprises first and second solenoid actuators coupled to the first and second gate members, respectively.

6. A stepping apparatus as recited in claim 5, wherein each of the first and second gate members has a first passage through which balls of the detector string freely pass, and a second passage through which only the cable of the detector string freely passes while providing an abutment against which the balls are blocked.

7. A stepping apparatus as recited in claim 6, further comprising means for stopping the first and second gate members when extended to an open position in which the balls of the detector string freely pass through the first passage of the respective gate member.

8. A stepping apparatus as recited in claim 1, wherein the actuator means comprises first and second solenoid actuators coupled to the first and second gate means, respectively.

9. A stepping apparatus as recited in claim 1, wherein the first and second gate means are spaced apart by a distance corresponding to a distance between two adjacent balls of the detector string.

10. A method of advancing a hydroball detector string having a plurality of spaced apart balls on a cable and being movable in a direction of a counter through a tube under fluid pressure, the method comprising:
   (a) blocking a first ball of the detector string by abutment with a first gate movable into a blocking position in the tube;
   (b) moving a second gate between an adjacent ball and the first ball into a blocking position within the tube;
   (c) withdrawing the first gate from a blocking position, whereby fluid pressure advances the detector string towards the counter until the adjacent ball abuts the second gate, thereby completing a first step;
   (d) moving the first gate between the first ball and the adjacent ball; and
   (e) withdrawing the second gate from a blocking position, whereby fluid pressure advances the detector string towards the counter until the adjacent ball abuts the first gate, thereby completing a second step.

11. A method as recited in claim 10, further comprising sequentially repeating steps (b)–(e) to further advance next adjacent balls of the detector string towards the counter.

12. A method as recited in claim 10, wherein the moving steps (b) and (d) and the withdrawing steps (c) and (e) comprise selectively energizing and de-energizing first and second solenoid actuators coupled respectively to the first and second gates.

* * * * *